UNITED STATES PATENT OFFICE

2,463,572

VINYLIDENE CHLORIDE-BUTADIENE-VINYL ACETATE INTERPOLYMERS

George William Stanton and Charles Everett Lowry, Midland, Mich., assignors to The Dow Chemical Company, Midland, Mich., a corporation of Delaware No Drawing. Application May 16, 1946, Serial No. 670,281

1 Claim. (Cl. 260—86.5)

This invention relates to vulcanizable interpolymers primarily suitable as calendered films or as coatings for flexible base materials. The invention relates in particular to certain interpolymers of vinylidene chloride, butadiene-1,3 or isoprene, and vinyl acetate.

Some of the binary copolymers of vinylidene chloride and vinyl acetate are disclosed and claimed by Wiley in U. S. Patent No. 2,160,931. The binary copolymers of vinylidene chloride and butadiene-1,3 are disclosed and claimed in U. S. Patents Nos. 2,215,379, 2,376,208 and 2,380,356, issued to the assignees of Sebrell, Tucker, and Youker, respectively.

The vinylidene chloride-vinyl acetate binary copolymers are thermoplastic materials which are neither rubbery nor vulcanizable. They range in properties from rigid and relatively insoluble materials at high vinylidene chloride concentrations to progressively more soluble materials as the amount of copolymerized vinyl acetate increases. Their principal utility has been in the formation of rigid moldings.

The vinylidene chloride-butadiene-1,3 binary copolymers vary from rigid thermoplastic and highly insoluble materials at vinylidene chloride concentrations above 90 per cent through strong rubbers having from 20 to 50 per cent and more of butadiene-1,3. At least when some of the commoner polymerization methods are employed, the vinylidene chloride-butadiene binaries containing roughly from 60 to 90 per cent of butadiene are factice-like solids of rather low strength which are capable of but little elongation. Though many of them are vulcanizable, this particular binary polymer system is deficient as regards most required coating properties and the products are relatively unsuitable for the preparation of useful thin films or for use as adhesives or bonding agents.

It is among the objects of the present invention to provide a vulcanizable synthetic rubber-like material adapted to form abrasion resistant and moisture impervious coatings, preferably by the relatively simple process of calendering the material on the desired base. Another object is to provide such a readily workable composition which can be employed as an adhesive or as a calendered film or coating without the use of solvents during the forming operation. A particular object is to provide a vulcanizable composition, as above described, comprising a ternary interpolymer of vinylidene chloride, butadiene and vinyl acetate. Other and related objects may appear hereinafter.

In the following description, the term "butadiene" is understood to signify the compound butadiene-1,3. The term "isoprene" refers to the compound 2-methyl butadiene-1,3. "Interpolymer" is used herein to mean the product obtained by the polymerization of a mixture of three or more monomers. To distinguish therefrom, the term "copolymer" is arbitrarily used herein to designate a product similarly derived from a mixture of two monomers.

It has now been found that the foregoing and related objects may be attained through the provision of an interpolymer formed by the polymerization of a monomeric mixture of from 20 to 80 per cent vinylidene chloride, from 15 to 50 per cent butadiene, and from 5 to 50 per cent vinyl acetate, and more particularly one obtained by the polymerization of from 20 to 70 per cent vinylidene chloride, from 5 to 50 per cent vinyl acetate and from 20 to 40 per cent butadiene. The preferred interpolymer for use in calendered coatings, or for the preparation of free films, is one containing from 35 to 70 per cent of vinylidene chloride, from 5 to 20 per cent of vinyl acetate and from 20 to 40 per cent of butadiene. The preferred composition of the present invention for use either as a coating material or as adhesives or as a bonding agent is a ternary interpolymer of from 20 to 50 per cent vinylidene chloride, from 30 to 50 per cent vinyl acetate and from 20 to 40 per cent of butadiene.

The ternary interpolymers of the present invention are most conveniently made by the emulsion polymerization process, preferably employing a mildly alkaline aqueous medium as the continuous phase of the emulsion. The new interpolymers have also been made in emulsion using the acidic conditions and catalyst described by Britton and LeFevre in U. S. Patent No. 2,333,633. They have also been made in aqueous suspension, without emulsifying agents, using benzoyl peroxide as the catalyst. For the present purposes of comparison between the various compositions in the interpolymer system of vinylidene chloride, butadiene and vinyl acetate, a standard polymerization procedure was adopted eliminating as far as possible any variations due to changes in relative concentrations of the disperse and continuous phases, catalysts, temperatures, emulsifiers, alkalies and the like. The standard procedure for small scale preparations is as follows:

A stock solution is prepared consisting of 98.5 per cent by weight of pure water, one per cent of a purified grade of sodium lauryl sulfate and 0.5 per cent of sodium carbonate. To 75 parts by weight of the aqueous stock solution is added 25 parts by weight of the chosen monomers in the proportions being investigated, and 0.125 parts of potassium persulfate is added as a catalyst. The mixture is emulsified by agitation and is kept at a constant temperature of 55° C. in a sealed vessel until polymerization has progressed to the desired extent. There is then added a small amount, suitably about 0.4 per cent, of an antioxidant, such as polymerized trimethyl dihydroquinoline. The latex is then coagulated after dilution with water, by addition of a 50 per cent aqueous methanol solution containing 0.4 per cent of magnesium chloride. The coagulum is washed with water and vacuum dried at 70° C. overnight. When making batches involving more than about a gallon of reaction medium the amount of monomer is increased to about 33.3 per cent of the weight of the emulsion and the stock solution is correspondingly fortified to contain about 1.5 per cent of the emulsifying agent and 0.75 per cent of sodium carbonate. The catalyst concentration is increased correspondingly to about .165 per cent.

When the new interpolymers are to be used as adhesives they are spread in any suitable manner upon one of the surfaces to be treated, the second surface is brought into contact with the interpolymer composition which may or may not contain sulfur, fillers, carbon black and other similar well-known rubber addition agents, and the entire assembly is heated under pressure at least for a sufficient period to distribute the adhesive uniformly. When vulcanizing agents are present this treatment is carried to a temperature and for a period of time to effect vulcanization and thermal-curing of the adhesive layer. Thereafter pressure may be released and it will be found that the surfaces are as firmly bonded as has been possible with any of the known adhesive compositions based on natural or other synthetic rubbers. The bond is superior to that obtained with most of the known synthetic rubbers because of the more favorable flow characteristics of the present interpolymers and because of their ability to be vulcanized in situ.

The new interpolymers may be used either in their natural state, or after being compounded, for the purpose of applying coatings to flexible base materials or for the preparation of moldings, sheet or film. A wide variety of formulations may be employed to yield satisfactorily compounded materials from the new interpolymers. For the purposes of the present description, and in order to obtain representative and comparable values in those tests carried out on compounded and vulcanized batches of the present ternary interpolymers, a standard procedure was developed and a standard formulation was employed. That formulation contained the following ingredients in the designated parts by weight.

| | |
|---|---|
| Interpolymer | 100 |
| Stearic acid | 1 |
| Butyl phthalyl butyl glycolate (plasticizer) | 10 |
| Litharge | 5 |
| Benzothiazyldisulfide | 1 |
| Sulfur | 2 |
| Carbon black | 35–40 |

(The preferred carbon blacks were selected from the class of "easy processing" channel blacks and "semi-reinforcing" furnace blacks.)

In preparing the test formulations, the interpolymers are first broken down on a cold mill, the addition agents are milled into the interpolymer in the order named, and the mixture is sheeted from the mill. It may be sheeted directly to a calender stack where the compounded sheet is brought into contact with a sheet of paper, cloth, or other flexible base material which it is desired to coat, and the assembly is passed through the stack to effect a reduction in thickness of the coating and to insure the provision of a uniform and continuous coating on the flexible base. The compounded sheet may also be fed from the mill through the calender stack without a supporting base material, thus providing a thin sheet or film of the compounded interpolymer. It is generally found desirable to cure the calendered films or coated or molded articles before they are adapted to use in commerce. Such cure can be effected at about 138° C. with or without the application of superatmospheric pressure (suitably up to 400 pounds per square inch) for periods up to about 75 minutes.

The suitability of the new interpolymers for use in coating operations is evidenced in part by their relatively low viscosities when contrasted with the viscosity of the binary copolymer of 70 per cent vinylidene chloride and 30 per cent butadiene (hereinafter referred to for purposes of comparison as copolymer A). Thus, when viscosity measurements are made using the Mooney plastometer as described in India Rubber World for April 1, 1935, at page 49, copolymer A has a viscosity of about 180. A series of ternary copolymers, all of which contain 30 per cent butadiene and individual members of which contain 10, 20, 30, 40, 50 and 60 per cent of vinyl acetate, the balance being vinylidene chloride, have Mooney viscosity values ranging from 173 down to 107. The same ternary interpolymers have greater elasticity as indicated by their Bashore rebound values than does copolymer A.

The low temperature flexibility of a coating for cloth, paper, leather, or other flexible bases is an important factor for many of the common uses of such coated materials. When the new interpolymers are mixed in their crude, i. e. unvulcanized state, with 1 per cent of wax and 1 per cent of stearic acid and calendered to produce an unsupported film, they are found to have brittle points below −70° C. while similarly produced films based upon copolymer A have brittle points of about −50° C. Flexible base materials coated with the new interpolymers retain a greater degree of flexibility at all commonly encountered low temperatures than do similar bases coated with the binary copolymer.

Of especial interest in connection with materials for coating flexible bases is the abrasion resistance value of the surface coating. Specimens of the new ternary interpolymers and of copolymer A were molded into sheets approximately 0.1 inch thick. Discs were cut from the molded sheets and were accurately weighed to 0.1 milligram. These specimens were mounted on the rotating table of an abrasion tester and subjected to the action of a rotating abrasive disc under a load of 1,000 grams. The table was rotated 500 times, after which the specimen was carefully brushed and reweighed. The abrasion resistance is reported as grams loss per 500 cycles of the abrasion tester. Under these conditions the ternary interpolymers containing from 35 to 70 per cent vinylidene chloride, from 5 to 20 per cent vinyl acetate and from 20 to 40 per cent butadiene showed no loss in weight while the binary copolymer of 70 per cent vinylidene chloride and 30 per cent butadiene exhibited a loss of .0016 gram.

The interpolymer of about 55 per cent vinylidene chloride, 15 per cent vinyl acetate and 30 per cent butadiene, which composition lies within the range of preferred coating materials, is particularly adapted for the preparation of free films by a calendering operation. These films have all of the previously described advantages of abrasion resistance and low temperature flexibility and have as well a much higher tear resistance than do similar films produced from copolymer A.

In the range previously defined as being preferred for coating purposes, all of the new interpolymers when in the crude, i. e. uncompounded and uncured state, have elongation values greater than 500 per cent. The specific interpolymer identified above, containing 15 per cent vinyl acetate and 30 per cent butadiene, may be calendered to produce films having elongation values as high as 700 per cent and tensile strengths of about 450 pounds per square inch.

The present ternary interpolymers, when compounded and cured in the manner previously described, are found to reach their maximum cure (as evidenced by tracing their changes in hardness, permanent set, elongation and tensile strength) in about one-half the time required to effect the same degree of cure in a similarly compounded composition based upon copolymer A. The latter is completely cured in from 100 to 120 minutes, while the new interpolymers are cured in from 50 to 60 minutes.

When the new interpolymers have been compounded and cured in the manner previously described they are found to have permanent set values of only about 6 per cent. They also exhibit a tensile stress at 100 per cent elongation of 1,040 pounds per square inch. By way of contrast, copolymer A, when similarly compounded and cured, has a permanent set value of 8 per cent and a tensile stress at 100 per cent elongation of only 785 pounds per square inch.

In the matter of numerous other properties which are desirable in coating and film forming compositions, the new interpolymers are highly resistant to the action of many chemicals commonly encountered by rubber surfaces, including strong acids and bases. They are also resistant, both in the crude and in the compounded and cured state, to the destructive effect of most common organic solvents, many of which may cause the composition to swell but none of which have been found to dissolve the present interpolymers. When polymerization conditions are varied, in known manner, to produce interpolymers of low molecular weight, the above-noted solvent resistance is not obtained, but the so-produced soluble interpolymers may be vulcanized in solution or they may be used as solvent-applied coatings or adhesives and then vulcanized.

Satisfactory adhesive compositions have been found to comprise the interpolymer of from 20 to 50 per cent vinylidene chloride, 30 to 50 per cent vinyl acetate and 20 to 40 per cent butadiene. Such interpolymers may be applied to one or more of the surfaces to be bonded, suitably by a calendering operation carried out at ordinary temperatures, and the surfaces may then be joined by applying a moderate pressure and a temperature suitably above 100° C. but below the decomposition temperature of the interpolymer. It may often be desired to effect the bonding operation while curing the adhesive. This may be effected by first compounding the adhesive composition with plasticizers, stabilizers, fillers, curing agents and sulfur in the usual manner, then applying such composition to one or more of the surfaces to be joined and forming the composite body under a moderate pressure at a temperature preferably near 137° to 140° C.

All of the specific compositions mentioned in the proceeding examples have contained 30 per cent of butadiene. The properties reported are substantially duplicated when corresponding interpolymers are produced with as little as 15 per cent or as much as 50 per cent of butadiene. When less than 15 per cent of butadiene is employed, the compositions become considerably more rigid and are of negligible utility for the purposes herein described. When more than about 50 per cent of butadiene is employed, abrasion resistance, flexibility, solvent and chemical resistance are all rapidly decreased and the products obtained are considerably weaker than those of the present invention.

Similar advantages may be shown for the corresponding ternary interpolymers containing isoprene as the diene hydrocarbon, in comparison with the vinylidene chloride-isoprene binary copolymers.

We claim:

The ternary, vulcanizable interpolymer made by dispersing in water and polymerizing together a monomeric mixture of 55 per cent vinylidene chloride, 30 per cent butadiene and 15 per cent of vinyl acetate.

GEORGE WILLIAM STANTON.
CHARLES EVERETT LOWRY.

REFERENCES CITED

The following references are of record in the file of this patent:

UNITED STATES PATENTS

| Number | Name | Date |
|---|---|---|
| 2,333,403 | Youker | Nov. 2, 1943 |
| 2,373,753 | Fryling | Apr. 17, 1945 |
| 2,376,014 | Semon | May 15, 1945 |
| 2,388,372 | Stewart | Nov. 6, 1945 |
| 2,400,036 | Wooddell et al. | May 7, 1946 |